United States Patent [19]

Suzuki et al.

[11] 4,435,772

[45] Mar. 6, 1984

[54] INTERACTIVE GRAPHIC SYSTEM

[75] Inventors: Yoshihiro Suzuki; Shuichi Nakagawa; Nobuhisa Kawamura; Shuichi Kurihara; Osamu Sakuma; Masahiro Ito, all of Tokyo, Japan

[73] Assignee: Yokogawa Hokushin Electric Corp., Tokyo, Japan

[21] Appl. No.: 273,424

[22] Filed: Jun. 15, 1981

[30] Foreign Application Priority Data

Mar. 11, 1981 [JP] Japan .................................. 56-33984

[51] Int. Cl.³ .......................................... G06K 15/22
[52] U.S. Cl. .................................................... 364/520
[58] Field of Search ............... 364/518, 520, 900, 419; 318/577; 346/27

[56] References Cited

U.S. PATENT DOCUMENTS

| | | | |
|---|---|---|---|
| 4,011,556 | 3/1977 | Tochitani et al. | 364/419 |
| 4,058,849 | 11/1977 | Fitzgerald et al. | 364/900 |
| 4,062,648 | 12/1977 | Hennessee | 364/520 |
| 4,135,245 | 1/1979 | Kemplin et al. | 364/520 |
| 4,313,073 | 1/1982 | Yamamoto et al. | 318/577 |
| 4,322,816 | 3/1982 | Spangler et al. | 364/520 |
| 4,346,445 | 8/1982 | Leuenberger et al. | 364/520 |

OTHER PUBLICATIONS

Spalding et al., "Intelligent Digital Plotter", *Microprocessors & Microsystems (USA)*, vol. 2, No. 6, Dec. 1978.

*Primary Examiner*—Errol A. Krass
*Attorney, Agent, or Firm*—Parmelee, Bollinger & Bramblett

[57] ABSTRACT

An interactive graphic system is provided which introduces drawing data step by step in the form of interaction to describe figures, characters, numerical figures or the like with the aid of a microcomputer. The interactive graphic system consists of a keyboard for introducing drawing data, a plotter for recording the figures, a microcomputer, and a memory unit that are constructed as a unitary structure which features small size, reduced cost and enhanced operational performance. Further, the interactive graphic system is so constructed that application software packages can be freely exchanged to diversify the functions.

6 Claims, 5 Drawing Figures

```
BARGRAPH
*POSITION (X1,Y1,X2,Y2)*230,180,310,240
*XMIN,XMAX*0.5,20.5
*YMIN,YMAX*0,600
*AXES CROSS POINT*0.5,0
*X TICK,MAJOR TICK SPACING*5,10
*Y TICK,MAJOR TICK SPACING*50,200
*FRAME*Y
*XLABEL POINT*6
*XLABEL* *10,20*
*YLABEL POINT*8
*YLABEL* AUTO
*NO OF DATA*20
*GRAPH PATTERN*C
*NO OF DATA IN ONE GROUP*5
*DATA*0,57,109,156,198
**236,270,302,330,356
**379,400,419,436,452
**466,479,490,500,510
*HATCHING*Y
*DATA NO,HATCHING PATTERN*2,1
*DATA NO,HATCHING PATTERN*3,5
*DATA NO,HATCHING PATTERN*4,2
```

1

INTERACTIVE GRAPHIC SYSTEM

BACKGROUND OF THE INVENTION

1. Field of the Invention

The present invention relates to an interactive graphic system which employs a microcomputer.

2. Description of the Prior Art

Heretofore there have been proposed various apparatus for drawing figures with the aid of a computer. For example, there is a drawing apparatus made up of the combination of a minicomputer and a graphic printer. This apparatus produces a drawing output which, however, is a copy from a cathode-ray-tube indicator (hereinafter referred to as CRT). Therefore, a limitation is imposed on the quality of the pictures, and specially produced papers must be also used. Further, since a large CRT having high resolving power is generally used, the apparatus becomes expensive. To eliminate the above defects, there has been proposed a drawing apparatus equipped with a graphic microcomputer and a plotter. The above apparatus, however, does not support drawing applications which can be used even by the beginners. Furthermore, the resolving power of the CRT is not sufficient in such an apparatus of reasonable cost. In recent years, there has been an interactive drawing apparatus capable of drawing superior figures of high quality with the aid of a minicomputer. However, this apparatus requires clumsy operation even for drawing simple figures, is expensive in cost, is large in size, and is not suited for personal use.

SUMMARY OF THE INVENTION

Accordingly, it is an object of the present invention to provide an interactive graphic system which is constructed as a unitary structure, small in size and inexpensive, which can be easily operated, which produces final outputs, i.e., recording outputs of very high quality, and which is suited for personal use.

Another object of the present invention is to provide an interactive graphic system which, when general-purpose program language is employed, enables the user to effect pre-treatment for drawing figures or to draw figures of a high quality.

A further object of the present invention is to provide an interactive graphic system the functions of which can be diversified by changing application software packages supplied in the form of storage media.

In carrying out this invention in one illustrative embodiment thereof, an interactive graphic system is provided for making drawings under keyboard control comprising a unitary structure of a processor having memory means, an X-Y plotter for making the drawing on a plotting surface, a keyboard for feeding instructions to the processor and a display for providing instructions for the operator. By following the displayed instructions, the operator operates the keyboard and the processor controls the X-Y plotter to make the desired drawing.

BRIEF DESCRIPTION OF THE DRAWINGS

The invention, together with further objects, aspects and advantages thereof will be more clearly understood from the following description taken in conjunction with the accompanying drawings in which.

DESCRIPTION OF THE PREFERRED EMBODIMENTS

Figure 1:
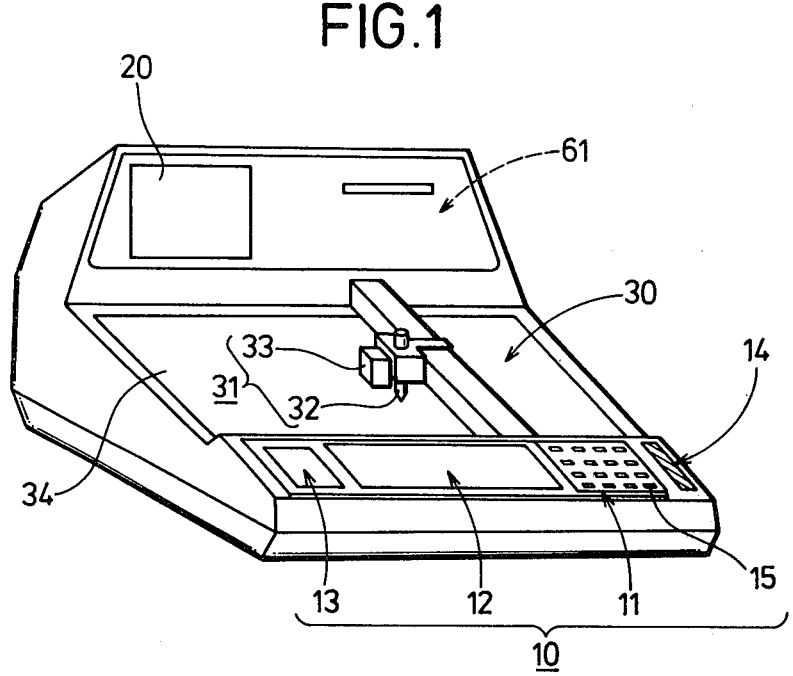
FIG. 1 is a perspective view showing the appearance of an interactive graphic system according to an embodiment of the present invention.
Figure 2:
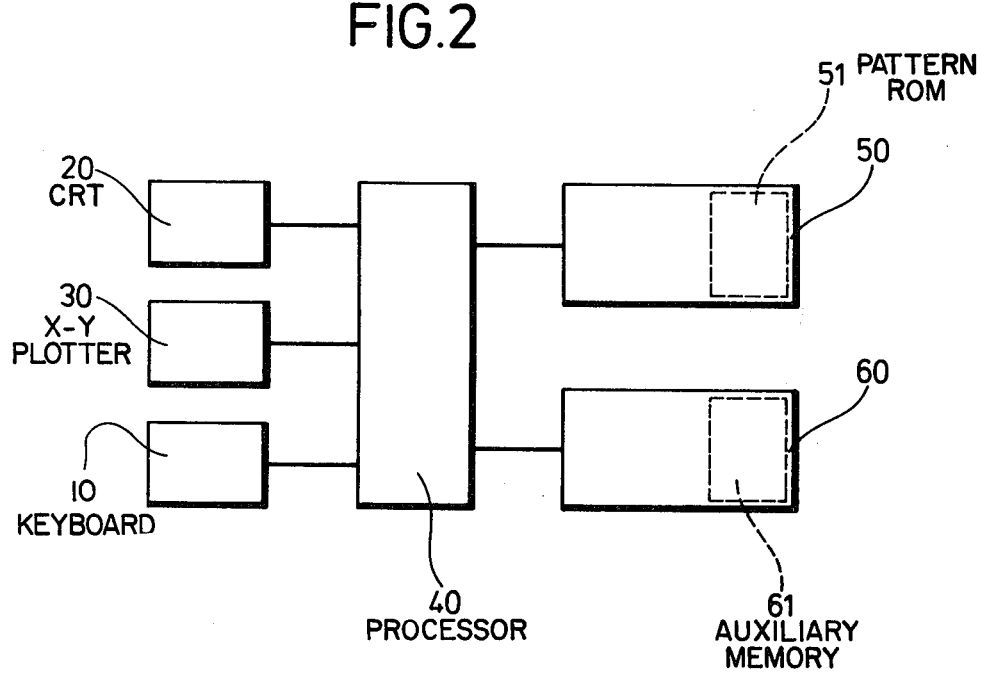
FIG. 2 is a block diagram illustrating the electric setup of the system of FIG. 1.

Referring now to FIGS. 1 and 2, the interactive graphic system, in accordance with an illustrative embodiment of this invention includes a keyboard 10, a CRT 20 which serves as a display, an X-Y plotter 30, a processor 40, a read-only memory 50 (hereinafter referred to as RAM).

Referring to FIG. 1, the keyboard 10 comprises function keys 11, full keys 12 and plotter control keys 13. The function keys 11 are used for specifying the kinds of graphs as well as the functions necessary for drawing the figures; one key corresponds to one fundamental function. The functional names of the individual keys are changed when the functions of the system are changed by exchanging the application package that will be mentioned later. Therefore, the name of the function can be changed by attaching, onto the function key 11, an overlay card 15 which indicates the name of the function depending upon the application that is used. The pattern data such as symbols corresponding to a variety of applications are stored in a pattern ROM 51 that will be mentioned later. The function keys 11 are used even when a pattern is to be specified by using the pattern ROM 51. When the pattern ROM 51 is to be exchanged, the name of the key can be changed by using the overlay card 15. Ten keys may also be provided in the unit of function keys 11 to facilitate the input of numerical figures.

The full keys 12 are chiefly used for introducing the program language, and are also used for specifying the characters when the characters are to be plotted on the X-Y plotter 30 or to assist the function keys 11.

The plotter control keys 13 are used chiefly for moving a cursor 33 of the plotter 30, for moving a recording pen up and down and for setting the plotting paper 34. The plotter control keys 13 can also be used for controlling the CRT 20.

The CRT 20 functions to display characters requiring the input of drawing data such as drawing parameters step by step in the form of interaction, as well as a graphic display function which enables the figures being drawn to be monitored.

The X-Y plotter 30 has a recording head 31 which is equipped with a recording pen 32 and a cursor 33 for positioning the recording pen. In other respects, the X-Y plotter 30 is constructed in the same manner as the conventional ones. One or two or more recording pens 32 will be mounted, and can be suitably selected as required. The cursor 33 specifies a point on the X-Y coordinate on the plotting surface 34, and can be suitably moved in either the direction X or the direction Y by manipulating the plotter control key 13.

The processor 40 executes various programs stored in the ROM 50 and RAM 60, and controls the keyboard 10, the CRT 20 and the X-Y plotter 30 and the like, and further transmits and receives the parameters and data.

A microprocessor can be suitably used as the processor 40. The ROM 50 has stored therein operating systems and various programs for drawing figures in the form of interaction, as well as general-purpose program language so that various tasks can be executed in addition to drawing the figures. The pattern ROM 51, which is a portion of the ROM 50, is constructed in the form of a plug-in module, inserted in a ROM slot 14 shown in FIG. 1, and is freely changeable by the modules of various contents. An auxiliary memory 61 occupies a portion of the RAM 60. The memory 61 can be used in roughly three different ways. Namely, the auxiliary memory 61 can be used for saving or loading the parameters or data that are stored during the step of drawing figures by the function keys 11. Or the auxiliary memory 61 can be used for saving and loading the programs or data that are programmed by the general-purpose program language and that are stored therein. Or the auxiliary memory 61 stores beforehand a program for supporting a particular application so that it can be suitably used. According to the last mode of usage, the functions of the system can be easily diversified. For example, a flexible disc can be used as the auxiliary memory 61.

The processor 40 controls the external units and collects suitable data via a suitably standardized bus (e.g., GP-IB) to keep communications with various external units, and prepares graphs or tables of predetermined types on the X-Y plotter 30.

Figure 3:
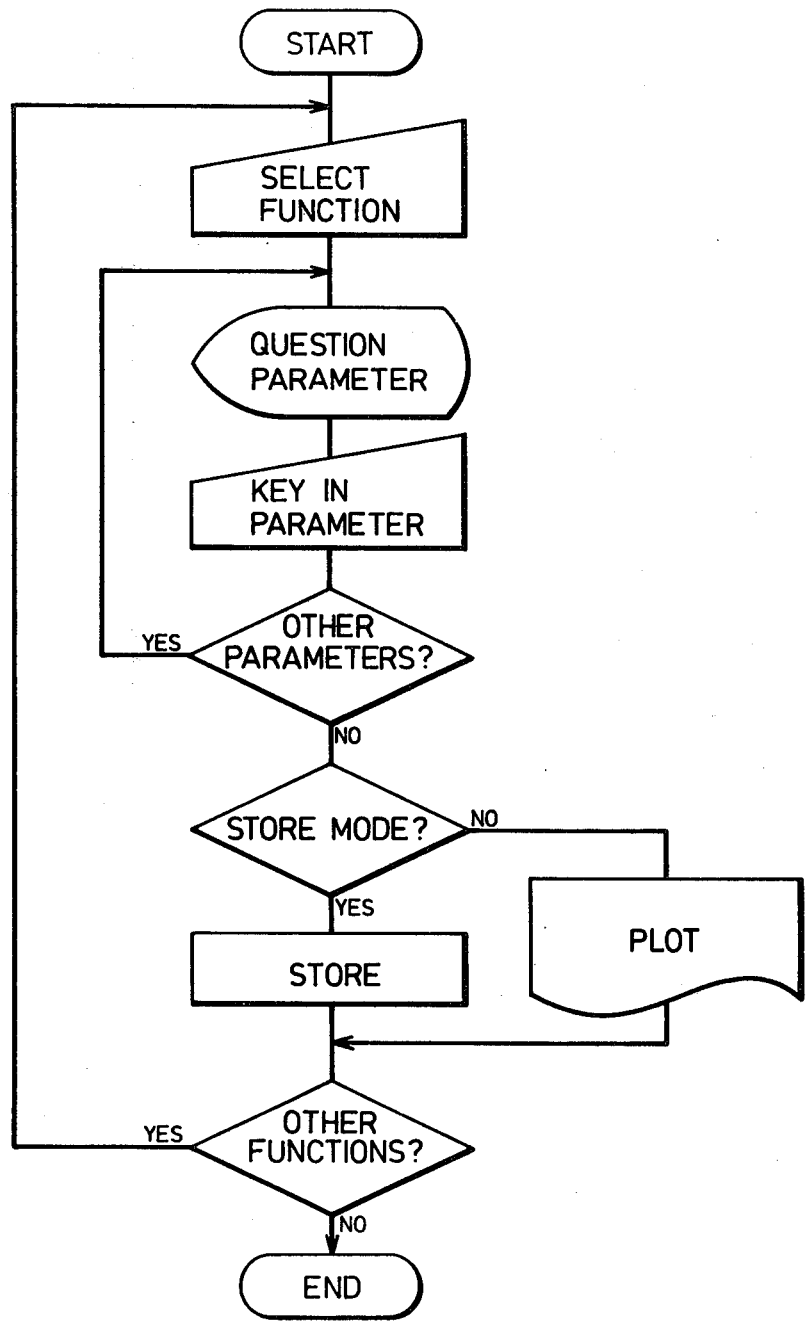
FIG. 3 is a flow chart which illustrates the operation.

The operation of the thus constructed system of the present invention will be illustrated below with reference to FIG. 3 which is a flow chart of a fundamental flow of operation for drawing figures. The operator, as required, fits a predetermined pattern ROM 51 related to the contents of drawing figures into the ROM slot 14, mounts the overlay card 15 of a type corresponding to the pattern ROM 51, and specifies the type of graph that is to be drawn and any other functions by function keys 11. The processor 40 commences to execute the drawing program of the type which is specified, and displays the inquiries of parameters necessary for the program on the CRT 20 in the form of a menu. Suitable parameters corresponding to the displayed inquiries are fed by manipulating the keyboard 10. Any other necessary parameters can be fed in the order of displayed inquiries. Then, the drawing mode is discriminated after the parameters necessary for one function have all been fed. The drawing mode can be divided into an execution mode such that every instruction is executed one after another, and such a store mode that the parameters are successively stored in the memory 60 so that a figure can be drawn at one time by running the drawing program. The keyboard 10 will have been set to either mode beforehand. The processor 40 executes the plotting operation or the storing operation according to the specified mode, and inquires whether or not there are any other new functions. When there are any other necessary functions, such functions are specified by the keyboard 10 to perform the same operation as mentioned above. Thus, the predetermined figures are all drawn by the store mode or execution mode of the predetermined parameters.

Here, the straight lines and curves are drawn by driving the plotter 30 which is controlled by the processor 40, in a customary manner. Therefore, the driving method is not illustrated here.

Figures 4, 5:
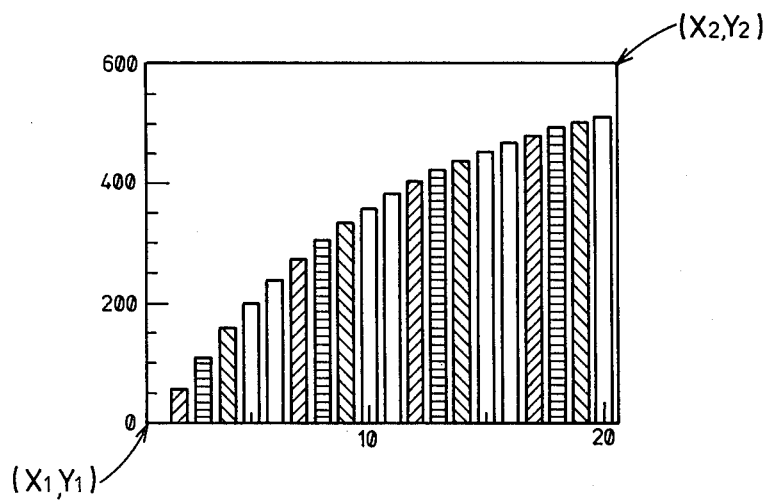
FIG. 4 is a diagram illustrating an example of one type of CRT display.
FIG. 5 is a diagram illustrating an example of drawing figures.

FIG. 4 illustrates a guide display of the form of a menu which is displayed on the CRT 20 when a bar graph is to be drawn by the aforementioned operation, and an example of a display when suitable parameters are fed by the keys. FIG. 5 illustrates figures drawn by the input of such parameters. When the function of the bar graph is specified, the CRT 20 displays the headline "BARGRAPH" as well as various items such as "POSITION (X1, Y1, X2, Y2)" to "DATA NO HATCHING PATTERN" which require parameters. The CRT 20 further displays the parameters of items which are being inquired by underlining using the cursor. Therefore, the operator must feed the parameters by operating the keyboard 10 according to the display of the cursor. The example of display of FIG. 4 is illustrated below. The "POSITION (X1, Y1, X2, Y2)" inquires a left lower intersecting point $(X_1, Y_1)$ on the axis of a graph and a point $(X_2, Y_2)$ at the right upper corner portion of the frame, and sets coordinates (230, 180) and (310,240). Then, numerical values 0.5 and 20.5 are fed by the keys in the keyboard 10 responsive to the inquiries of a minimum value and a maximum value on the X axis. The same operation is so effected for a minimum value and a maximum value on the Y axis. Then, 0.5 and 0 are given as the co-ordinate values of the intersecting point of the axes which are inquired by the next display "AXES CROSS POINT". The next item "X TICK, MAJOR TICK SPACING" specifies the space of the graduated lines on the X axis. Namely, space 5 of graduated lines is fed and then, space 10 of main graduated lines having a long segment is fed. Graduated lines of the Y axis are also specified in the same manner. Then, with reference to the presence or absence of frame lines opposed to the X axis and Y axis, Y is fed by the key in the item of "FRAME" when the figure is to be drawn, and N is fed by the key in the item of "FRAME" when the figure is not to be drawn. Then, the axis labels are set. A point of the axis label is set with respect to the item "XLABEL POINT". The point serves as a parameter which indicates how much the position should be deviated from a predetermined position relative to the X axis (or Y axis) of the axis label; here, a numerical value 6 is given. Numerical values 10 and 20 are fed as X axis labels according to the specified point. Parameters are also fed with regard to the Y axis in the same manner as above. However, "AUTO" may simply be specified if the predetermined labels of the standard type can be applied. Then, a data number 20 is specified for "NO OF DATA" which inquires the total number of the data. As for "GRAPH PATTERN", the type C is selected and specified among several predetermined types of bar graphs. The "NO OF DATA IN ONE GROUP" specifies how much data should be fed as one group. According to this embodiment, one group consists of five data. The data are then fed. Here the presence or absence of hatching is specified (Y when it is present, and N when it is not present) for the inquiry of "HATCHING". When hatching exists the data is fed with regard to which data it is, and with regard to the number of the type of hatching pattern.

Thus, the graphs can be easily prepared. The system of the present invention, however, is capable of drawing not only graphs but also complicated figures. The system is further equipped with a particular function for displaying figures on an enlarged scale. Namely, once the drawing program is stopped during the operation of drawing figures, the cursor 33 is moved by manipulating the plotter control keys 13 to specify the range of figures being drawn, and the figures within the range is displayed on the CRT 20 on an enlarged scale. Accordingly, figures can be drawn more accurately while monitoring the figures that are displayed on an enlarged scale on the CRT 20. In this case, the CRT 20 need not necessarily possess high resolving power but may have a relatively small resolving power; i.e. the figures can be sufficiently monitored on an enlarged scale.

Further, since a program has been stored to support a general-purpose program language, pre-treatment can be easily effected to draw the figures and superior figures can be easily drawn maintaining high precision.

As illustrated in the foregoing, the interactive graphic system of the present invention has the following features and effects:

(1) The keyboard for introducing various drawing data, X-Y plotter, CRT, auxiliary memory and the like are constructed as a unitary structure. Further, the system is small in size, cheaply constructed, easily operated, and is suited for personal use.

(2) The figures can be drawn by chiefly manipulating the plotter, and by feeding the data such as drawing parameters step by step according to a guide display on the CRT by means of the keyboard. Therefore, even a beginner can easily manipulate the system.

(3) Owing to the employment of the application package system, a variety of applications can be executed in the vertical and lateral directions by exchanging the package. Therefore, the functions can be easily diversified.

(4) The operability can further be increased for preparing symbols owing to the use of a pattern ROM which stores pattern data such as symbols that correspond to a variety of applications.

(5) Owing to the provision of a firmware which supports the preparation of most widely used typical graphs and symbols, the system can be easily operated even by a beginner to draw figures.

(6) Since the general-purpose program language is supported, pre-treatment can be easily effected for drawing figures, and superior figures can be drawn maintaining high precision.

(7) The monitoring range for drawing figures is specified by the cursor of the plotter, and the figures are displayed on an enlarged scale on the CRT. Accordingly, the system is very convenient for drawing figures.

(8) A standardized GP-IB bus is employed to keep communications with the external units. Therefore, it is possible to control the external units, to draw graphs by introducing the measured values, and to prepare tables.

Since other changes and modifications varied to fit particular operating requirements and environments will be apparent to those skilled in the art, the invention is not considered limited to the examples chosen for purposes of illustration, and covers all changes and modifications which do not constitute a departure from the true spirit and scope of this invention.

What is claimed is:

1. An interactive graphic system comprising:

an X-Y plotter having a recording pen supported on a recording head drivable in response to an input signal for recording lines, symbols or marks on a plotting surface;

a keyboard having a plurality of function keys allotted to a variety of functions related to plotting, full keys bearing characters, numerals and symbols, and control keys for controlling said X-Y plotter;

a memory for storing an operating system with a program required for controlling the execution of a drawing program and a program required for plotting graphic patterns on an interactive basis, said memory including an exchangeable storage medium for storing various forms of fundamental graphic information accessible as desired by a command entered through said keyboard;

a display having a character display function for displaying characters as a guide for the inputting of graphic pattern drawing information via said keyboard and a graphic display function for displaying graphic patterns plotted;

a processor for executing the program stored in said memory for plotting graphic patterns in response to information entered through said keyboard; and said X-Y plotter, said keyboard, said memory, said display, and said processor being a unitary structure for enabling said X-Y plotter to plot graphic patterns in response to information entered through said keyboard through interaction with said display.

2. An interactive graphic system according to claim 1, wherein said exchangeable storage medium stores a variety of application programs for changing said graphic function.

3. An interactive graphic system according to claim 1, wherein said recording head has a cursor for positioning coordinate points on said plotting surface, including means for moving said cursor in an X or Y direction by manipulating said keyboard to allow said display to display any graphic pattern of the type specified by said functions keys on said keyboard within a range designated by said cursor.

4. An interactive graphic system according to claim 1, wherein said exchangeable storage medium comprises a removable plug-in type memory.

5. An interactive graphic system according to claim 1, wherein said program contains an execution mode for executing each graphic instruction one after another, and a storage mode for drawing a graphic pattern at one time after all of a series of instructions necessary for such a graphic pattern have been entered, said modes being selected through said keyboard.

6. An interactive graphic system according to claim 1, including a standardized bus for connection to an external input unit for entering information to plot graphic patterns in response to parameters entered through said external input unit.

* * * * *